US007909628B2

(12) United States Patent
Yu et al.

(10) Patent No.: US 7,909,628 B2
(45) Date of Patent: Mar. 22, 2011

(54) CARD CONNECTOR HAVING AN IMPROVED SPRING MEMBER

(75) Inventors: Jian-Fei Yu, Kunshan (CN); Fang-Yue Zhu, Kunshan (CN); Qi-Jun Zhao, Kunshan (CN)

(73) Assignee: Hon Hai Precision Ind. Co., Ltd., New Taipei (TW)

( * ) Notice: Subject to any disclaimer, the term of this patent is extended or adjusted under 35 U.S.C. 154(b) by 0 days.

(21) Appl. No.: 12/763,141

(22) Filed: Apr. 19, 2010

(65) Prior Publication Data

US 2010/0267260 A1 Oct. 21, 2010

(30) Foreign Application Priority Data

Apr. 17, 2009 (CN) .......................... 2009 2 0302303

(51) Int. Cl.
*H01R 13/62* (2006.01)
(52) U.S. Cl. ........................................................ 439/159
(58) Field of Classification Search .................. 439/159, 439/64, 607.01, 607.02, 630, 160
See application file for complete search history.

(56) References Cited

U.S. PATENT DOCUMENTS

| 6,814,596 | B2 | 11/2004 | Yu et al. | |
|---|---|---|---|---|
| 7,744,391 | B2 * | 6/2010 | Yu et al. | 439/159 |
| 7,794,249 | B2 * | 9/2010 | Yu et al. | 439/159 |
| 2010/0087074 | A1 * | 4/2010 | Yu et al. | 439/81 |

* cited by examiner

*Primary Examiner* — Javaid Nasri
(74) *Attorney, Agent, or Firm* — Wei Te Chung; Andrew C. Cheng; Ming Chieh Chang (57) ABSTRACT

A card connector (100) for insertion of an electrical card (200) includes an insulative housing (1) defining a receiving space (12) for insertion of the electrical card; a set of contacts (2) retained in the insulative housing; and an ejecting mechanism (3) including a slider (31), a coil spring (33) for urging the slider, a connecting rod (34) for restraining the slider, and a spring member (32) retained in the slider. The spring member has a retaining portion (322) retained in the slider, an arcuate cantilever locking arm (324) extending from the retaining portion and protruding towards the receiving space for retaining the electrical card, and a restricting portion (326) extending from a front free end portion (325) of the locking arm and being restricted in a cavity (316) of the slider.

14 Claims, 6 Drawing Sheets

CARD CONNECTOR HAVING AN IMPROVED SPRING MEMBER

BACKGROUND OF THE INVENTION

1. Field of the Invention

The present invention relates to a card connector, and more particularly to a card connector having an improved spring member for retaining an electrical card.

2. Description of Related Art

With constant development of communications and computer technology, more and more electrical cards are being designed to meet various requirements. Electrical card connectors are used to connect these electrical cards with corresponding mainframes. A conventional card connector usually comprises an insulative housing, a plurality of terminals coupled thereto, an ejecting mechanism retained in the insulative housing for ejecting the electrical card out of the insulative housing and a shell shielding the insulative housing. The ejecting mechanism includes a slider movable with the electrical card, a coil spring for giving the slider an elastic force to realize ejecting the memory card, a connecting rod having an one-end bend portion retained in the insulative housing and an other-end bend portion movable in a heart-shaped cam groove formed in the slider, and a spring member retained in the slider. The spring member has a cantilever locking arm for retaining or locking with the electrical card so as to retain the electrical card in the receiving space.

When the electrical card is inserted into the receiving space, especially when the electrical card is slantwise inserted into the receiving space at the beginning, the cantilever locking arm is deflected from its original place and will have a deformation. Therefore, the deflective locking arm can not retain the electrical card in the receiving space effectively.

Hence, an improved card connector is desired to overcome the above problems.

BRIEF SUMMARY OF THE INVENTION

According to one aspect of the present invention, a card connector for insertion of an electrical card comprises an insulative housing defining a receiving space for insertion of the electrical card; a plurality of contacts retained in the insulative housing and protruding into the receiving space for electrical connection to the electrical card; and an ejecting mechanism comprising a slider movable along a front-to-back direction, a coil spring for urging the slider, a connecting rod for restraining a movement of the slider relative to the insulative housing, and a spring member retained in the slider. The spring member has a retaining portion retained in the slider, an arcuate cantilever locking arm extending from the retaining portion and protruding towards the receiving space for retaining the electrical card, and a restricting portion extending from a front free end portion of the locking arm and being restricted in a cavity of the slider.

According to another aspect of the present invention, a push-push type card connector, comprises an insulative housing comprising a receiving space for insertion of an electrical card and a bottom wall being located under the receiving space, the bottom wall having a plurality of passageways communicating with the receiving space and a slot located at a lateral side of the passageways; a plurality of terminals received in the passageways and extending into the receiving space for electrical connection to the electrical card; and an ejecting mechanism comprising a slider movably received in the slot along card-insertion or card-withdrawn directions, a coil spring for urging the slider, a connecting rod for restraining the slider, and a spring member retained in the slider. The spring member has a retaining portion retained in the slider, an arcuate locking arm extending from the retaining portion and protruding towards the receiving space for locking with a notch of the electrical card. The slider has a dependent portion located at outside of the locking arm and defines an oblique surface abutting against a free end portion of the locking arm for preventing the locking arm from over deformation.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE PREFERRED EMBODIMENT

In the following description, numerous specific details are set forth to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Figure 1:
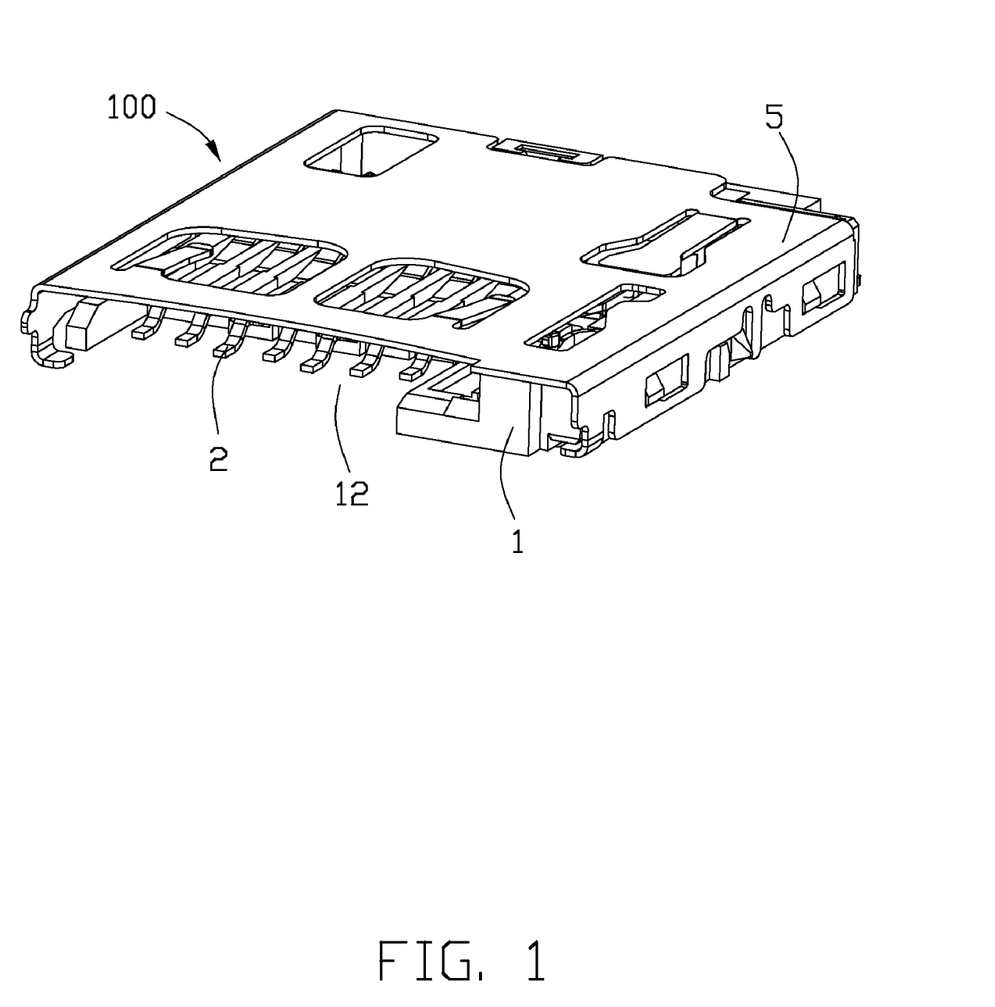
FIG. 1 is a perspective view of a card connector according to the present invention.
Figure 2:
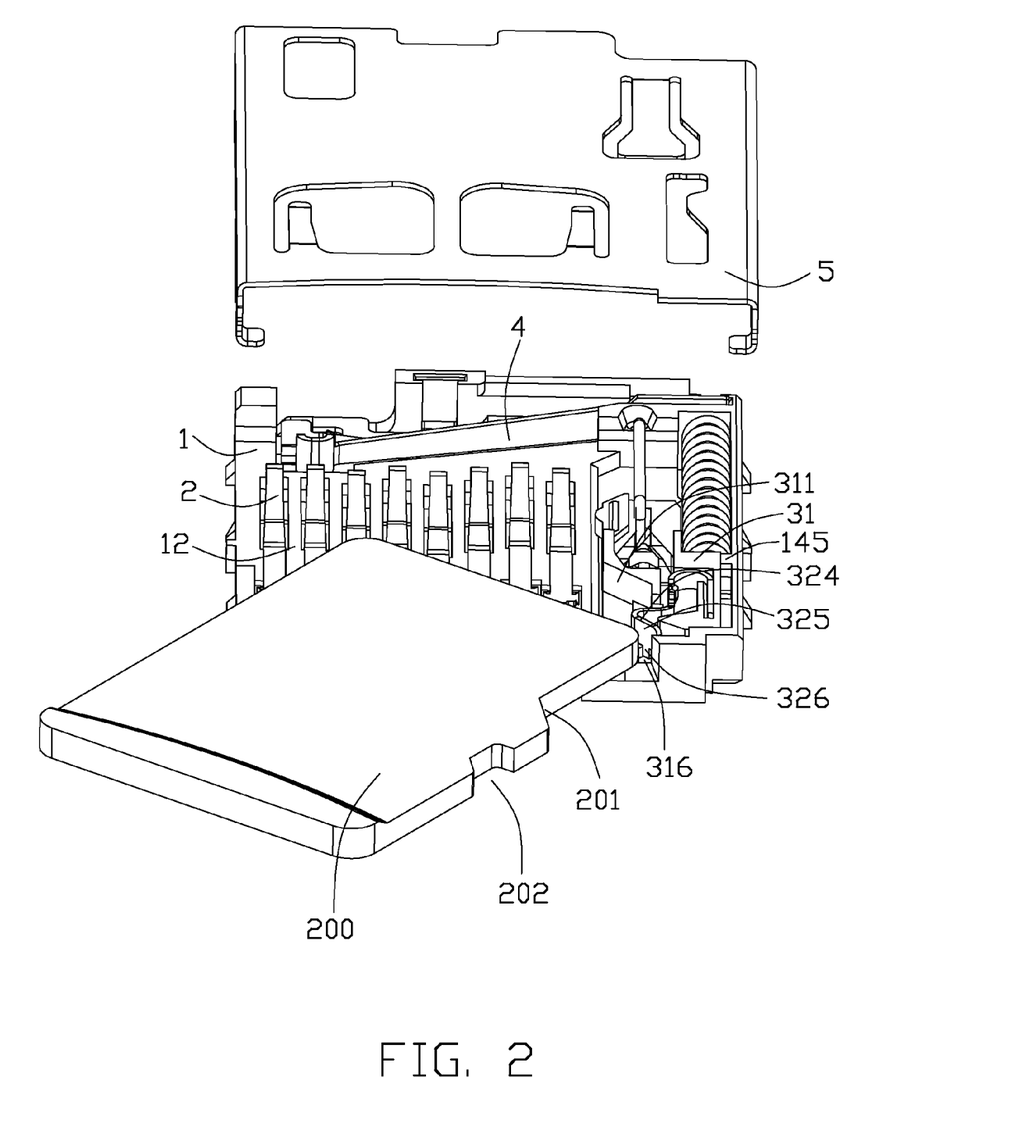
FIG. 2 is a partly exploded view of the card connector shown in FIG. 1 with an electrical card to be inserted therein slantwise.
Figure 3:
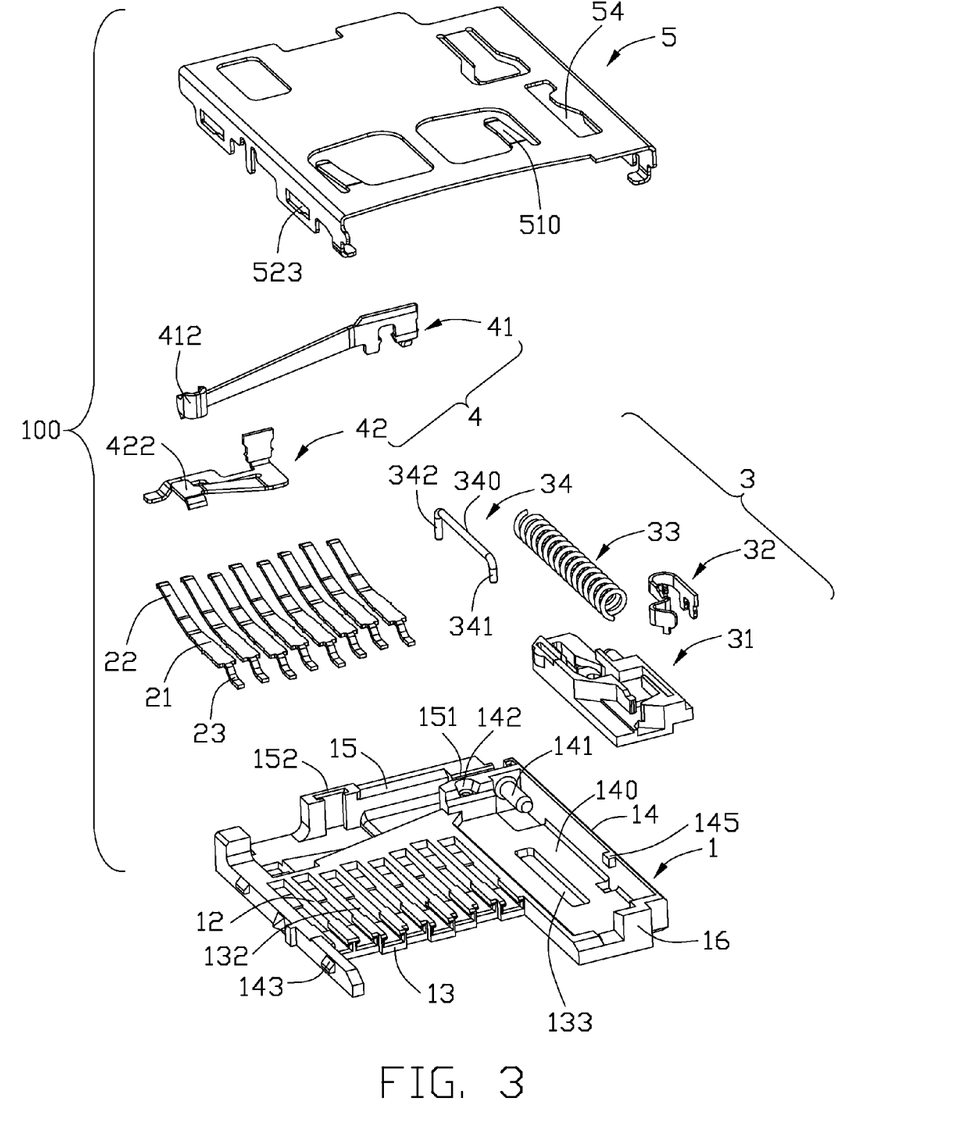
FIG. 3 is an exploded view of the card connector shown in FIG. 1.

Referring to FIGS. 1-3, a card connector 100 for insertion of an electrical card 200 according to the present invention, comprises an insulative housing 1, a plurality of terminals 2 retained in the insulative housing 1, an ejecting mechanism 3 coupled to the insulative housing 1, a pair of switch contacts 4 retained in the insulative housing 1 and a shell 5 covering the insulative housing 1. In the preferred embodiment, the memory card connector 100 is a MicroSD card connector for receiving a corresponding MicroSD 200.

Figure 4:
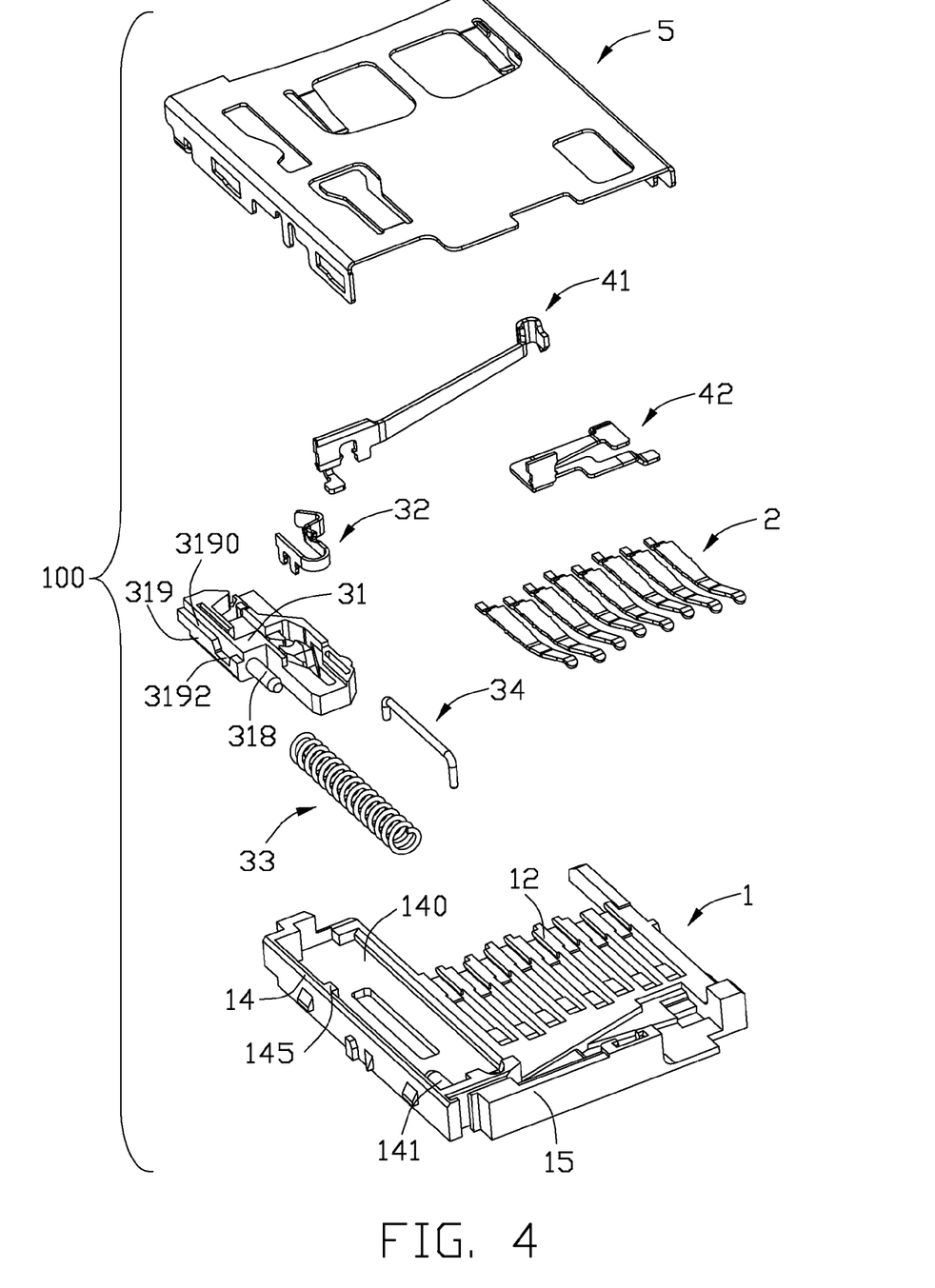
FIG. 4 is another exploded view of the card connector shown in FIG. 1.

Referring to FIGS. 2-4, the insulative housing 1 defines a receiving space 12 for insertion of the electrical card 200. The insulative housing 1 comprises a bottom wall 13, a rear wall 15 extending upwardly from a rear end of the bottom wall 13, a side wall 14 extending upwardly from a lateral side of the bottom wall 13 and connecting with the rear wall 15, and a stopping portion 16 extending upwardly from a front end of the bottom wall 13 and connecting with the side wall 14. The bottom wall 13 has a plurality of passageways 132 for retaining the terminals 3 and a slot 140 on a right side of the passageways 132. A through hole 133 which locates under the slot 140 passes through the bottom wall 13 and communicates with the slot 140. The rear wall 11 has a pair of grooves 151, 152 for retaining the switch contacts 4, an aperture 142 formed thereon, and a first post 141 extending forwardly therefrom. The side wall 14 has a protrusion 145 extending inwardly from an inner and upper side thereof. A set of projections 143 are formed on two lateral sides of the insulative housing 1.

Each terminal 2 has a connecting portion 21 retained in the respective passageway 132, a contacting portion 22 extending forwardly from a front end of the connecting portion 21 and protruding upwardly into the receiving space 12 for electrical connection to the electrical card 200, and a tail portion 23 extending backwardly from a rear end of the connecting portion 21 for electrical connection to a printed circuit board (not shown).

Referring to FIGS. 2-6, the ejecting mechanism 3 is located on a right side of the bottom wall 13 and comprises a slider 31 movable along card-insertion or card-withdrawing directions, a connecting rod 34 for restraining the slider 31, a coil spring 33 for urging the slider 31, and a spring member 32 fixed to the slider 31 for locking with the electrical card 200. The slider 31 is movably received in the slot 140 and has a block (not shown) on a lower face thereof to be movably received in the through hole 133. A heart-shaped cam groove 313 and a retaining slot 314 are recessed downwardly from an upper surface 310 of the slider 31. The slider 31 has a second post 318 extending backwardly therefrom, a slanted portion 311 extending slantwise relative to the card-insertion direction for abutting against a chamfer 201 of the electrical card 200, a supporting portion 312 defining a step 3120 for sustaining the electrical card 200, and a dependent portion 317 extending upwardly from the step 3120 and located at a front end thereof. A cavity 316 is recessed downwardly from an upper surface of the step 3120 and goes through a front face 3171 of the slider 31. A standoff 319 extends outwardly from a right side of the slider 31 and has a top face 3190 lower than the upper face 310 of the slider 31. The standoff 319 has a depression 3192 recessed downwardly from the top face 3190 for the protrusion 145 passing through. In assembling the slider 31 to the slot 140 of the bottom wall 13, the depression 3192 on the standoff 319 will accommodate the protrusion 145, and the standoff 319 will not have an interfering engagement with the protrusion 145. Therefore, the slider 31 will be easily assembled to the slot 140 of the bottom wall 13.

Figure 5:
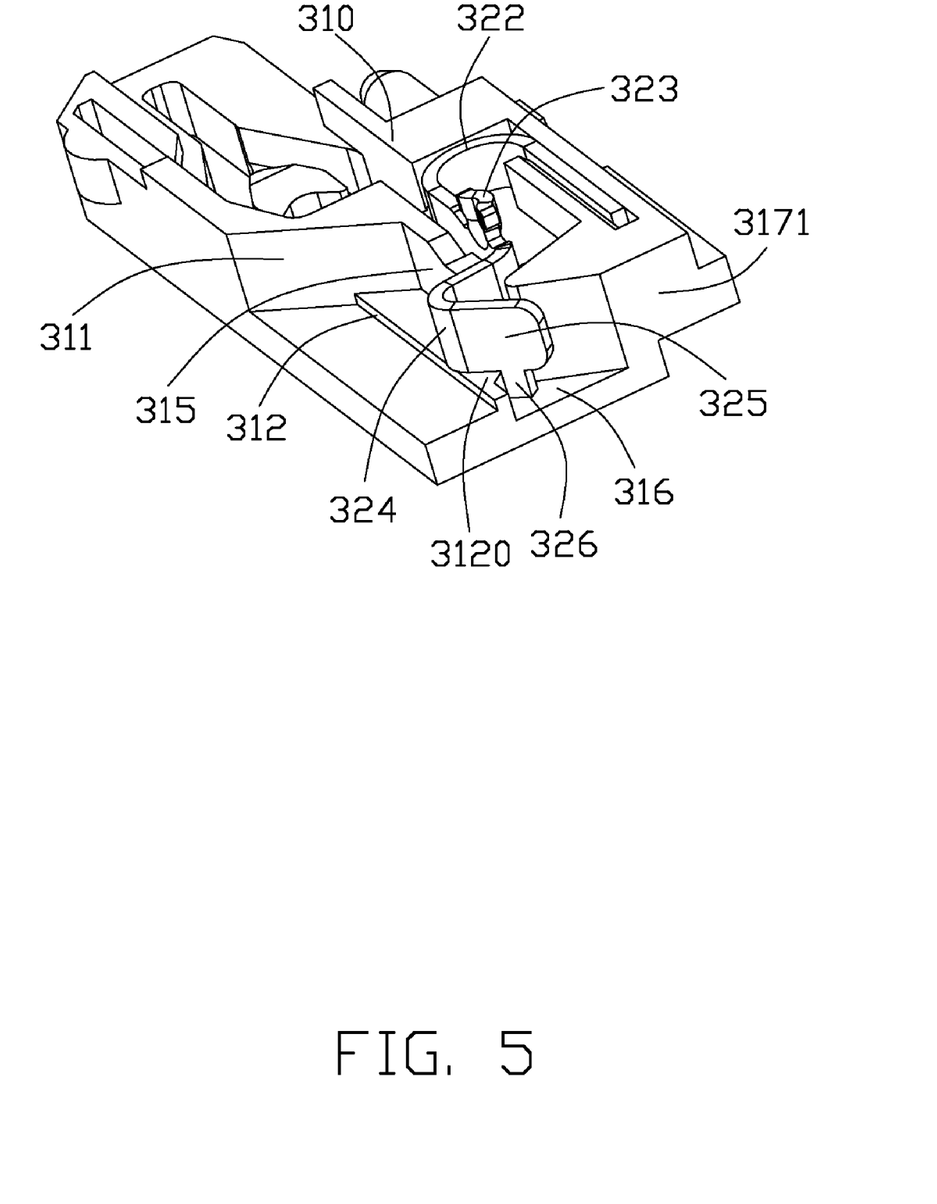
FIG. 5 is a perspective view of a slider with a spring member retained therein of the card connector shown in FIG. 1.
Figure 6:
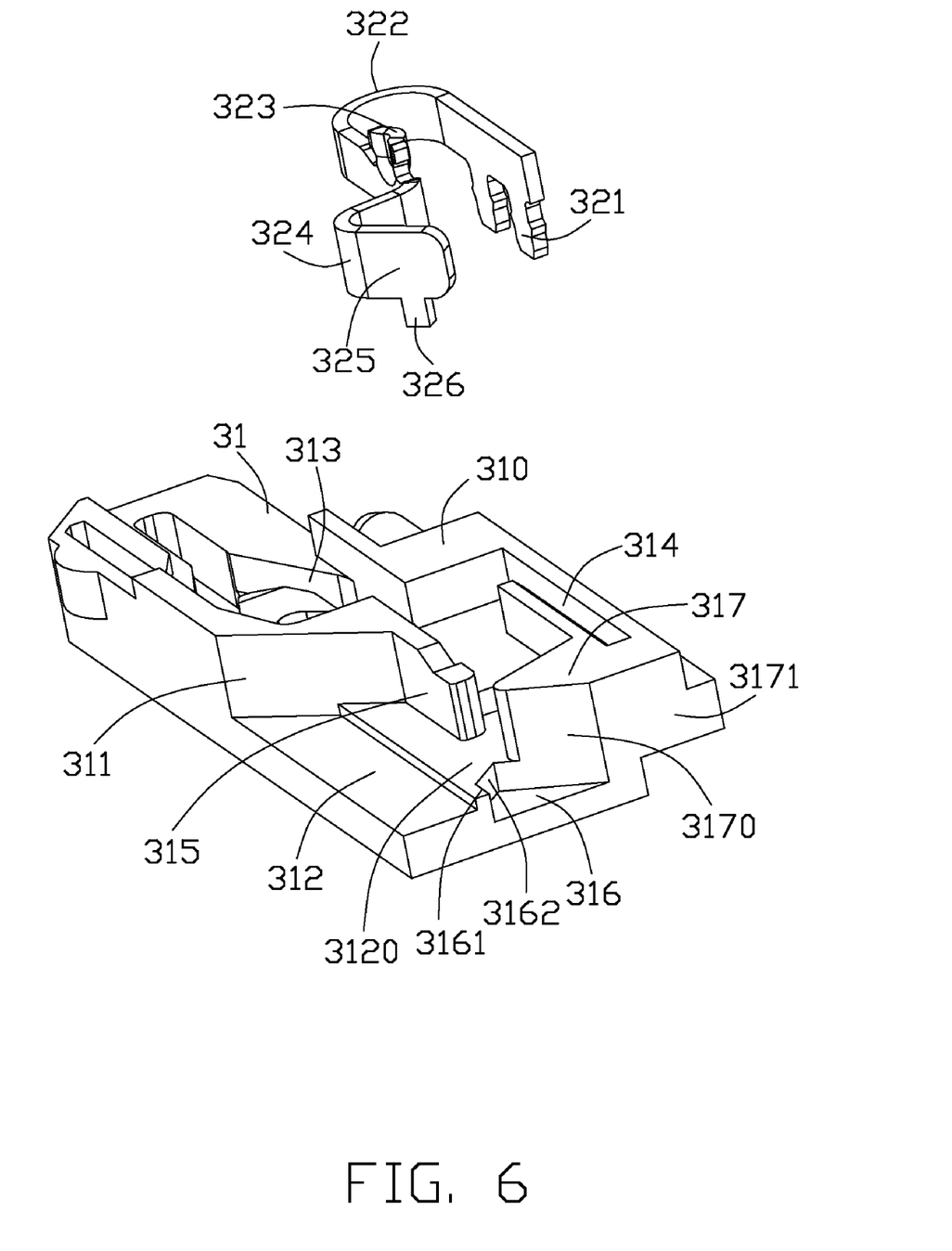
FIG. 6 is an exploded view of the slider and the spring member shown in FIG. 5.

The spring member 32 includes an U-shaped retaining portion 322 retained in the retaining slot 314, an arcuate locking arm 324 extending from the retaining portion 322 and bowed towards to the receiving space 12 for locking with a notch 202 of the electrical card 200, a sideward dimple 323 formed on the retaining portion 322, and a pair of legs 321 extending downwardly from the retaining portion 322 for being fixed into the slider 31. In another embodiment, the retaining portion 322 could be insert molded with the slider 31. The locking arm 324 has a restricting portion 326 extending downwardly from a lower edge of a front free end portion 325 thereof and received in the cavity 316. The cavity 316 forms a limiting face 3161 extending along the card-insertion direction for abutting against the restricting portion 326 outwardly and a guiding face 3162 extending slantwise relative to the limiting face 3161 for the restricting portion 326 sliding along. The slider 31 has a resisting portion 315 extending forwardly from the slanted portion 311 for resisting the locking arm 324 forwardly. When the electrical card 200 is inserted into the receiving space 12, especially when the electrical card 200 is inserted into the receiving space 12 slantwise, the locking arm 32 will be deflected by a side of the electrical card 200, the cavity 316 will restrain the restricting portion 326 therein and the resisting portion 315 will resist the locking arm 324 so as to prevent the locking arm 324 from over deformation. Furthermore, the dependent portion 317 has an oblique surface 3170 extending slantwise relative to the card-insertion direction for abutting against the free end portion 325 of the locking arm 324 to prevent the locking arm 324 from over deformation and forming an obtuse angle with the guiding face 3162.

The coil spring 33 is assembled between the first and second posts 141, 318. The coil spring 33 gives the slider 32 elastic force to realize ejecting the memory card 200 from the memory card connector 100.

The connecting rod 34 has a rear end bend portion 342 retained in the aperture 142 and a front end bend portion 341 movably received in the heart-shaped cam groove 313. The card connector 100 is so-called push-push type card connector and the working theory of the card ejecting mechanism 3 is well known to those of ordinary skill in the art, so the detailed description is omitted hereinafter. When the slider 31 is assembled into the slot 140 of the insulative housing 1, the protrusion 145 abuts downwardly against the standoff 319 so as to prevent the slider 31 from moving upwardly away from the insulative housing 1 under the elastic force of the coil spring 33. Therefore, the slider 31 could be retained in the slot 142 firmly without the shell 2. In this way, the shell 5 could be assembled onto the insulative housing 1 conveniently.

Referring to FIGS. 3-4, the switch contacts 4 are retained in the grooves 142 of the rear wall 15 and located at a rear of the receiving space 12. The switch contacts 4 include a first contact 41 and a second contact 42. The first contact 41 includes a first mating portion 412 and the second contact 42 includes a second mating portion 422 in condition that the first and the second mating portion 412, 422 can be selectively on/off determined by the insertion position of the memory card 200.

The shell 5 has a set of openings 523 for being retained in the projections 143. The shell 5 has a pair of spring tabs 510 formed on the shell 5 and extend backwardly into the receiving space 12 for abutting against the electrical card 200, and a slit 54 on a right side of the spring tabs 510 and extending along the card-insertion direction for the sideward dimple 323 movably received therein.

It is to be understood, however, that even though numerous, characteristics and advantages of the present invention have been set fourth in the foregoing description, together with details of the structure and function of the invention, the disclosed is illustrative only, and changes may be made in detail, especially in matters of number, shape, size, and arrangement of parts within the principles of the invention to the full extent indicated by the broad general meaning of the terms in which the appended claims are expressed.

What is claimed is:

1. A card connector for insertion of an electrical card comprising:
 an insulative housing defining a receiving space for insertion of the electrical card;
 a plurality of contacts retained in the insulative housing and protruding into the receiving space for electrical connection to the electrical card; and
 an ejecting mechanism comprising a slider movable along a front-to-back direction, a coil spring for urging the slider, a connecting rod for restraining a movement of the slider relative to the insulative housing, and a spring member retained in the slider, the spring member having a retaining portion retained in the slider, an arcuate cantilever locking arm extending from the retaining portion and protruding towards the receiving space for retaining the electrical card, and a restricting portion extending from a front free end portion of the locking arm and being restricted in a cavity of the slider; wherein the slider has a supporting portion for sustaining the electrical card and a slanted portion extending upwardly from the supporting portion for abutting against a chamfer of the electrical card, the cavity is recessed downwardly from an upper surface of the supporting portion, the restricting portion extends downwardly from a lower edge of the free end portion; wherein the cavity goes through a front face of the slider, and forms a limiting face extending along the front- to-back direction for abutting against the restricting portion outwardly and a guiding face extending slantwise relative to the limiting face for the restricting portion sliding along.

2. The card connector according to claim 1, wherein the slider has a dependent portion extending upwardly from the supporting portion and located at outside of the free end portion, the dependent portion defines an oblique surface extending slantwise relative to the front-to-back direction for abutting against the free end portion and forming an obtuse angle with the guiding face.

3. The card connector according to claim 1, wherein the slider has a resisting portion extending forwardly from the slanted portion for resisting the locking arm forwardly.

4. The card connector according to claim 1, wherein the insulative housing has a bottom wall defining a slot for the slider being movably received therein and a side wall extending upwardly from a lateral side of the bottom wall, the side wall has a protrusion extending from an upper side thereof to abut downwardly against the slider.

5. The card connector according to claim 4, wherein the slider defines an upper face, and has a standoff extends from a lateral side of the slider and defining a top face lower than the upper face, the protrusion abuts against the top face of the standoff.

6. The card connector according to claim 5, wherein the standoff has a depression recessed downwardly from the top face thereof for accommodating the protrusion to be easily assembled into the slot.

7. The card connector according to claim 1, wherein the retaining portion presents as an U shape and is retained in a retaining slot recessed downwardly from an upper surface of the slider, the spring member has a pair of legs extending downwardly from the retaining portion and being fixed into the slider.

8. The card connector according to claim 1, wherein the electrical card connector further comprises a shell shielding the insulative housing, the shell defines a slit extending along the front-to-back direction, the spring member has a sideward dimple formed on the retaining portion and protruding into the slit to be movably received in the slit.

9. A push-push type card connector, comprising:

an insulative housing comprising a receiving space for insertion of an electrical card and a bottom wall being located under the receiving space, the bottom wall having a plurality of passageways communicating with the receiving space and a slot located at a lateral side of the passageways;

a plurality of terminals received in the passageways and extending into the receiving space for electrical connection to the electrical card; and an ejecting mechanism comprising a slider movably received in the slot along card-insertion or card-withdrawn directions, a coil spring for urging the slider, a connecting rod for restraining the slider, and a spring member retained in the slider, the spring member having a retaining portion retained in the slider, an arcuate locking arm extending from the retaining portion and protruding towards the receiving space for locking with a notch of the electrical card; wherein the slider has a dependent portion located at outside of the locking arm and defines an oblique surface abutting against a free end portion of the locking arm for preventing the locking arm from over deformation; wherein the slider has a supporting portion for sustaining the electrical card and a cavity recessed downwardly from an upper surface of the supporting portion, the locking arm has a restricting portion extending downwardly from a lower edge of the free end portion for being restricted in the cavity of the slider.

10. The push-push type card connector according to claim 9, wherein the supporting portion defines a higher step for sustaining the electrical card, the cavity is recessed downwardly form the upper surface of the step.

11. The push-push type card connector according to claim 9, wherein the slider has a slanted portion extending upwardly from the supporting portion for abutting against a chamfer of the electrical card and a resisting portion extending forwardly from the slanted portion for resisting the locking arm forwardly.

12. The push-push type card connector according to claim 9, wherein the insulative housing has a side wall extending upwardly from a lateral side of the bottom wall, the side wall has a protrusion extending inwardly from an inner side thereof and spaced from the bottom wall along a height direction of the insulative housing, the slider has a lower standoff extending from a lateral side thereof and sandwiched between the bottom wall and the protrusion.

13. The push-push type card connector according to claim 12, wherein the standoff has a depression recessed downwardly from a top face thereof for the protrusion passing through in assembling the slider to the slot of the bottom wall.

14. An electrical card connector for use with an electrical card, comprising:

an insulative housing defining a card receiving space;

a plurality of contacts disposed in the housing with contacting sections extending into the card receiving space;

a slider located by one lateral side of the card receiving space and moveable relative to the housing in a front-to-back direction;

a metallic spring retained to the slider and defining a locking arm extending into the card receiving space for engagement within a notch formed in a lateral side of the electrical card, said locking arm defining two sides of a triangular configuration including an oblique side extending along an oblique direction and confronting forwardly to an exterior and a lateral side behind said oblique side; wherein said slider defines a resisting portion intimately located behind the lateral side in said front-to-back direction, and an oblique surface extending along said oblique direction and intimately beside the oblique side in a sideward direction perpendicular to said front-to-back direction so as to prevent over-deflection of the locking arm during oblique insertion of the electrical card into the card receiving space along another oblique direction perpendicular to said oblique direction; wherein said oblique side defines a restriction portion extending in a vertical direction perpendicular to both said front-to-back direction and said sideward direction, said restriction portion being restrictively received in a cavity of the slider in front of said oblique surface.

* * * * *